United States Patent [19]

Glaze

[11] Patent Number: 4,733,744
[45] Date of Patent: Mar. 29, 1988

[54] STEERABLE DRIVING AXLE

[75] Inventor: Jack G. Glaze, Fort Wayne, Ind.

[73] Assignee: Dana Corporation, Toledo, Ohio

[21] Appl. No.: 904,020

[22] Filed: Sep. 2, 1986

[51] Int. Cl.4 .......................... B60G 19/06; B62D 7/06
[52] U.S. Cl. .................................... 180/256; 280/691;
280/694
[58] Field of Search ....................... 180/252, 256, 257;
280/961, 694, 669, 718, 691

[56] References Cited

U.S. PATENT DOCUMENTS

| 1,416,797 | 5/1922 | Dechamps. | |
|---|---|---|---|
| 1,575,118 | 3/1926 | Lipcot. | |
| 1,596,321 | 8/1926 | Spayd. | |
| 1,797,578 | 3/1931 | Hoffman | 180/257 |
| 2,796,943 | 12/1953 | Rolt et al.. | |
| 3,155,186 | 11/1964 | Cadnus et al.. | |
| 3,602,523 | 5/1969 | Poulos. | |
| 3,765,698 | 10/1973 | Burrell | 280/669 |

Primary Examiner—John J. Love
Assistant Examiner—Donn McGiehan
Attorney, Agent, or Firm—Macmillan, Sobanski & Todd

[57] ABSTRACT

A steerable driving axle assembly is provided with a centrally located differential assembly which is fixed to a vehicle frame member and includes a pair of axle drive shafts having inner ends coupled to output shafts of the differential assembly. Each of the axle drive shafts is surrounded by a separate axle tube which has an inner end pivotally attached to the housing of the differential assembly. Each of the axle drive shafts has an outer end coupled to drive a separate rotatable wheel member which is rotatably supported by a mounting portion of a wheel assembly. In accordance with the present invention, the outer end of each axle tube is pivotally coupled to the mounting portion of the wheel assembly by a king pin mounting arrangement. Also, each of the axle tubes is independently suspended by a separate leaf spring which is coupled to the axle tube by a unique spring mounting pad which permits pivotal movement of the leaf spring relative to the axle tube about a generally horizontal spring axis generally perpendicular to the longitudinal axis of the tube. Further, to reduce the overall size of the differential assembly, the present invention includes a planatary gear reduction assembly in each wheel assembly.

17 Claims, 5 Drawing Figures

STEERABLE DRIVING AXLE

BACKGROUND OF THE INVENTION

The present invention relates generally to a driving axle assembly for a wheeled vehicle and, in particular, to a steerable driving axle assembly including a centrally located differential assembly secured to a vehicle frame member and connected to drive a pair of steerable wheel assemblies which are independently suspended by a pair a leaf springs.

Steerable driving axle assemblies having independently suspended wheel assemblies are well known. Examples of such steerable wheel assemblies are disclosed in U.S. Pat. Nos. 2,796,943 to Rolt et al and 3,155,186 to Cadmus et al. While the steerable driving axle assemblies disclosed in these patents are suitable for certain applications, there has been a need for a steerable driving axle which is provided with relatively high ground clearance and incorporates a rugged suspension system for off-road use

SUMMARY OF THE INVENTION

The present invention relates to a unique steerable driving axle which includes a rugged leaf spring suspension system and has a structure which provides for relatively high ground clearance. The driving axle of the present invention is especially suited for a vehicle adapted for off road use.

The preferred embodiment of the invention includes a differential assembly which is fixed to a vehicle frame member and includes an input shaft adapted to be connected to the vehicle engine. A pair of axle drive shafts are provided, with each of the axle drive shafts defining a rotating axis and having an inner end coupled to a separate one of a pair of differential output shafts by a separate universal joint assembly. A separate axle tube surrounds each of the axle drive shafts and defines a longitudinal axis generally coaxial with the rotating axle of the axle drive shaft. The inner end of each axle tube is pivotally attached to the differential assembly.

A pair of wheel assemblies each include a rotatable wheel member and a mounting portion for rotatably supporting the wheel member. Each of the axle drive shafts has an outer end coupled to drive a separate one of the wheel assemblies by a separate universal joint assembly. Also, each of the axle tubes has an outer end pivotally coupled to the mounting portion of the wheel assembly by a king pin mounting arrangement to enable pivotal movement of the wheel assembly about a king pin axis. Steering means are coupled to each of the mounting portions of the wheel assemblies for controlling the movement of the wheel assemblies about the king pin axes.

Also, in order to minimize the size of the differential assembly, each of the wheel assemblies includes a planetary gear reduction means for reducing the rotational speed of the associated wheel member relative to the associated axle drive shaft.

Further, the present invention includes a unique rotatable spring pad for supporting an intermediate portion of a leaf spring having outer ends attached to a vehicle frame member. The leaf spring mounting pad is adapted to be secured to an axle tube and permits pivotal movement of the leaf spring about a first generally horizontal spring axis generally perpendicular to the longitudinal axis of the axle tube, and resists pivotal movement of the leaf spring relative to the axle tube about a second spring axis generally parallel to the longitudinal axle tube axis.

A steerable driving axle assembly of the type described above has been found to be especially suited for off road use. By pivotally coupling the axle tubes to the mounting portion of the wheel assemblies by a king pin mounting arrangement, and by providing rotatable spring pads such that the axle tube can be resiliently supported by means of leaf springs, the axle assembly is greatly simplified. Moreover, by providing gear reduction means in the wheel assemblies, the overall size of the differential can be kept to a minimum, thus maintaining maximum ground clearance.

The above, as well as other advantages of the present invention, will become readily apparent to one skilled in the art from reading the following detailed description of the invention in conjunction with the attached drawings.

p BRIEF DESCRIPTION OF THE DRAWINGS

FIG. 4 is a sectional view of the novel leaf spring mounting pad according to the invention, taken along the line 4—4 in FIG. 1; and FIG. 5 is an exploded perspective view of the spring mounting pad show in FIG. 4.

DESCRIPTION OF THE PREFERRED EMBODIMENT

Figure 1:
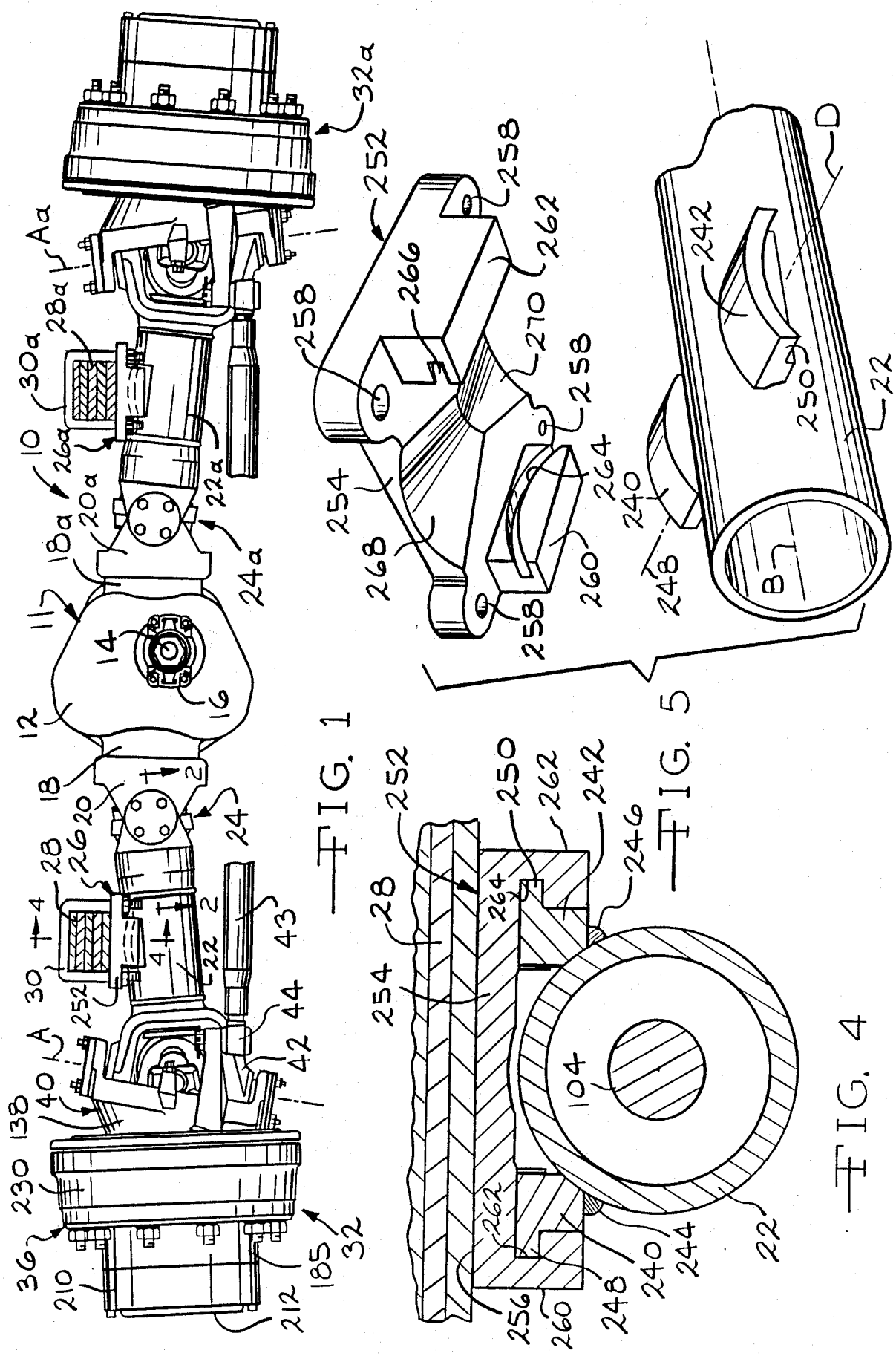
FIG. 1 is a rear elevational view of a steerable driving axle assembly according to the preferred embodiment of the invention.

Referring to FIG. 1, there is shown a rear elevational view of a steerable drive axle 10 according to the present invention. Since the steerable drive axle 10 is symmetrical about a centrally located differential assembly 11, only the left hand portion of FIG. 1 will be discussed in detail. When referring to identical or mirror-image components located on the right hand portion, reference numerals identical to those which designated similar components on the left side will be used with the addition of alphabetic subscripts. Also, since the internal components of the differential assembly 11 are well known to those skilled in the art, they will not be discussed herein.

The differential assembly 11 includes an outer case 12. A differential input shaft 14 extends outwardly from a central portion of the differential case 12 and is provided with an input yoke assembly 16 for attachment to an engine drive member (not shown). The differential case 12 includes a pair of collars 18 and 18a which are adapted to be attached to a vehicle chassis (not shown) by conventional mounting blocks (not shown) for supporting the differential assembly. The outer ends of the collars 18 and 18a are secured to fixed yoke members 20 and 20a which are pivotally coupled to the inner ends of axle tubes 22 and 22a at joint locations 24 and 24a respectively. The details of the pivotal connection at the location 24 are illustrated in FIG. 2 and will be discussed in more detail hereinafter.

The axle tubes 22 and 22a are provided respectively with spring pads 26 and 26a. The spring pads 26 and 26a are utilized to support leaf springs 28 and 28a, (shown in section in FIG. 1) which are attached to the vehicle chassis (not shown) in a conventional fashion. The springs 28 and 28a are attached to the spring pads 26 and 26a by conventional spring shackles 30 and 30a. As will be discussed in more detail below with reference to FIGS. 4 and 5, the spring pads 26 and 26a are rotatably mounted on the axle tubes 22 and 22a such that the associated leaf springs can pivot about a horizontal axes perpendicular to the longitudinal axes of the axle tubes. Thus, the springs will not be subjected to torsional forces due to the pivoting movement of the axle tubes 22 and 22a.

Figure 3:
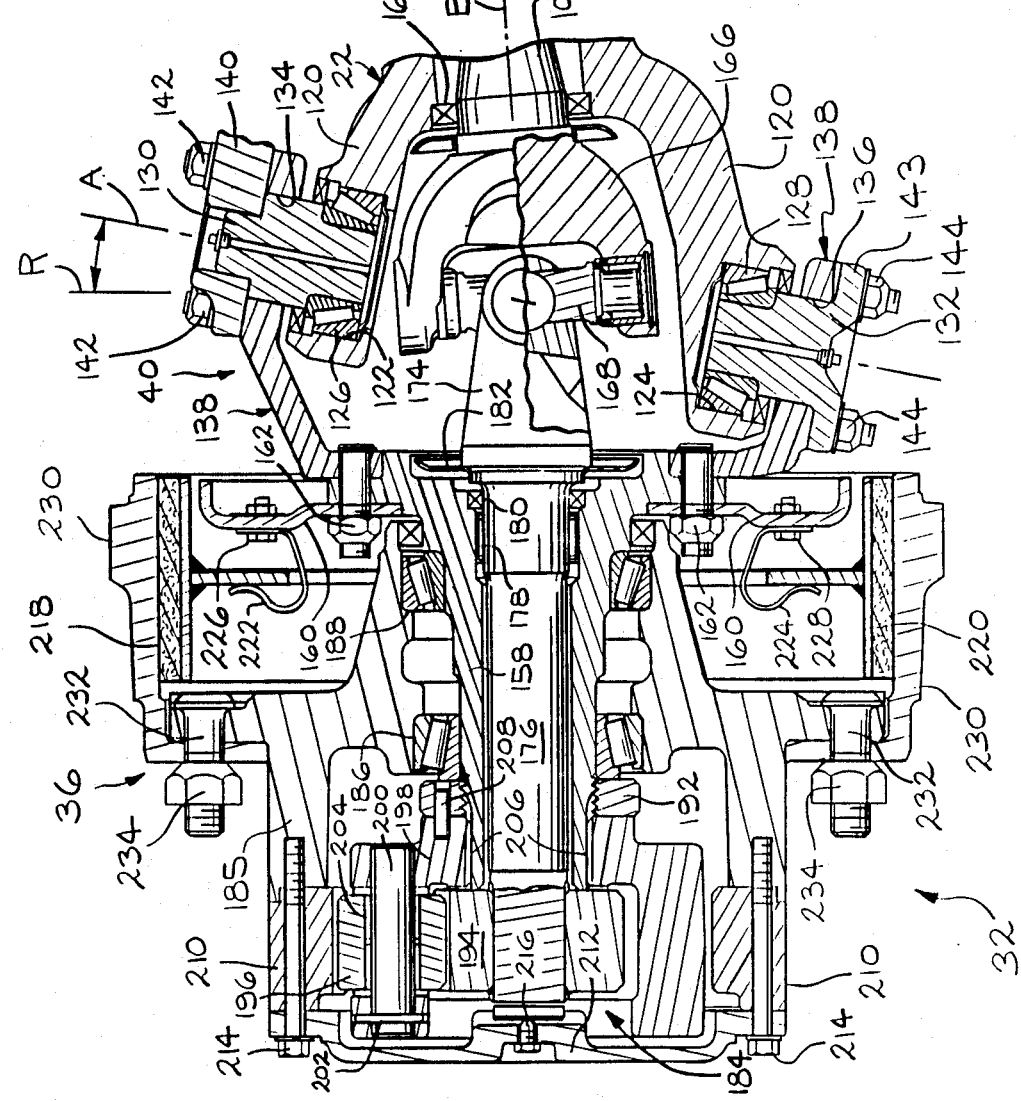
FIG. 3 is a partial sectional view which illustrates the interconnection between the wheel assembly and the outer ends of the axle tube and the axle shaft, along with the planetary gearbox which is incorporated in the wheel assembly.

Each of the axle tubes 22 and 22a also serves as a lower control arm, and is pivotally connected to one of a pair of steerable wheel assemblies 32 and 32a about one of king pin axes A and $A_a$. The left hand steerable wheel assembly 32 includes a wheel mounting portion 36 rotatably supported by a backing plate assembly 40. The backing plate assembly 40 is pivotally coupled to the outer end of the axle tube 22 about the axis A and is provided with a steering arm 42 which is connected to a conventional tie rod 43 by a conventional ball joint 44. The tie rod 43 in turn is connected to a conventional steering gearbox (not shown) through conventional steering hardware such as a Pitman arm, and idler arm (not shown). The construction of the right hand steerable wheel assembly 32a is similar to the construction of the wheel assembly 32. The details of steerable wheel assembly 32 are best shown in FIG. 3 and will be described in greater detail hereinafter.

Figure 2:
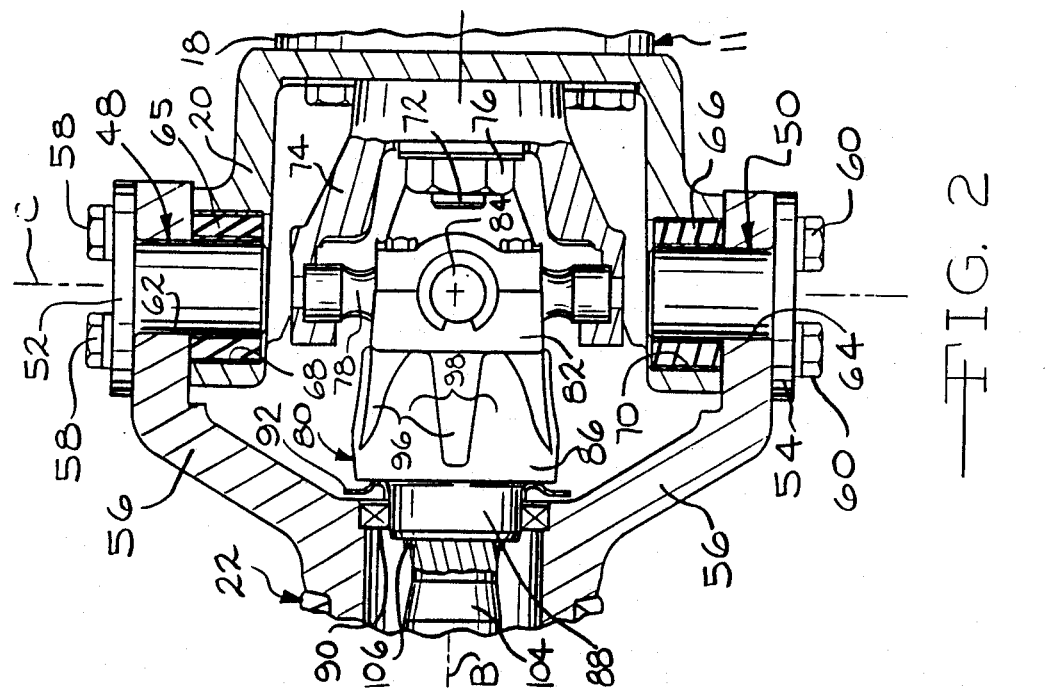
FIG. 2 is a partial sectional view of the mechanical interconnection between the fixed differential gearbox and the inner ends of the moveable axle tube and axle shaft, taken along the line 2—2 in FIG. 1.

Turning now to FIG. 2, the details of the joint location 24 for pivotally coupling the inner end of the axle tube 22 to the fixed yoke member 20 are illustrated. The axle tube 22 defines a longitudinal axis B. The fixed yoke 20 is pivotally mounted relative to the axle tube 22 about a pivot axis C by hinge pins 48 and 50. The outer ends of the hinge pins 48 and 50 are provided with flanges 52 and 54 which are secured to a yoke portion 56 of the axle tube 22 by bolts 58 and 60 respectively. The inner ends of the hinge pins 48 and 50 pass through spaced apart and aligned apertures 62 and 64 provided in the axle tube yoke portion 56 and are received within rubber bushings 65 and 66 respectively. The rubber bushings 65 and 66 are mounted in spaced apart and aligned apertures 68 and 70 provided in the fixed yoke member 20. Such a construction has been found to provide sufficient absorption of impact loads without damage to the axle assembly.

The differential assembly 11 includes an output shaft 72 having a universal joint yoke 74 fastened thereto by means of a nut 76. The yoke 74 is adapted to drive a conventional universal joint cross-member or spider 78 which in turn is coupled to drive a yoke member 80. The axle tube axis B and the pivot axis C intersect at the center of the cross member 78.

The yoke member 80 is provided with a body portion 82 which is secured to cross pins 84 of the universal joint cross-member 78 by a cap member 86. The body portion 82 has a reduced diameter end portion 88 which sealingly engages an annular seal assembly 90. An annular shield plate 92 can be mounted about the reduced diameter portion 88 to resisting entry of contaminates into the seal assembly 90. The body portion 82 is coupled to the inner end of an axle shaft 104 having an rotating axis coaxial with the axle tube axis B. The axle shaft 104 can be provided with external splines which can be received within internal splines (not shown) formed in the body portion 82. A snap ring 106 can be provided to axially locate the body portion 82 on the inner end of the axle shaft 104.

Turning now to FIG. 3, the steerable wheel assembly 32 will now be discussed in more detail. As shown in FIG. 3, the outer end of the axle tube 22 is provided with an outboard yoke portion 120 which defines upper and lower bearing pockets 122 and 124 aligned along the king pin axis A. The bearing pockets 122 and 124 receive upper and lower tapered roller bearing assemblies 126 and 128 which in turn receive the inner ends of upper and lower king pins 130 and 132 respectively. The king pins 130 and 132 pass through aligned apertures 134 and 136 respectively provided in a mounting or backing plate 138 to pivotally support the backing plate relative to the outer end of the axle tube 22 about the king pin axis A. In the preferred embodiment, the king pin axis A is angled approximately 10 degrees relative to a vertical reference axis R which extends through the intersection of the king pin axis A and the axle tube axis B.

The upper king pin 130 is secured relative to the upper end of the backing plate 138 by means of a retaining plate 140 and a plurality of bolts 142. The retaining plate 140 can be integral with or secured to a conventional steering arm (not shown). The lower king pin 132 has an outer end provided with an integral flange 143 which is secured to the lower end of the backing plate 138 by means of a plurality of bolts 144. A spindle member 158 and a brake mounting plate 160 are secured to the backing plate 138 by means of a plurality of circumferentially spaced apart bolt assemblies 162.

The outer end of axial shaft 104 is rotatably supported at the outer end of the axle tube 22 by means of a seal assembly 164. A universal joint yoke member 166 is shown as integral with the outer end of the axle shaft 104 and is adapted to support a conventional universal joint cross-member 168. The king pin axis A and the axle tube and axle shaft axis B intersect at the center of the cross member 168. The cross member 168 is coupled to a yoke member 174 which is shown as integral with a shaft member 176. The inner end of the shaft member 176 is supported within the spindle member 185 by means of a roller bearing assembly 178 which can be protected from contamination by a seal 180 and an annular shield member 182.

The outer end of the shaft member 176 is supported by means of a planetary gear reduction assembly 184. The planetary gear assembly 184 is provided to reduce the speed of the rotation of the wheel mounting portion 36 relative to the rotational speed of the shaft member 176. It has been found that providing a gear reduction means in each wheel assembly enables the overall size of the differential assembly 11 to be reduced, thus maintaining maximum ground clearance for the vehicle. The wheel mounting portion 36 includes a wheel mount 185 which is rotatably supported on the spindle member 158 by means of a pair of spaced apart tapered roller bearings 186 and 188. A conventional grease seal 190 is located between the inner end of the wheel mount 185 and the spindle member 158. The wheel mount 185 is maintained on the spindle 158 by means of an internally threaded locking nut 192 which is threaded onto an externally threaded portion provided near the outer end of the spindle 158 and engages the inner race of the outer tapered roller bearing 186.

The planetary gear assembly 184 includes a sun gear 194 which is splined to the outer end of the shaft member 176 for rotation therewith. A plurality of circumferentially spaced planet gears 196 (only one of which is shown in FIG. 3) are carried by a planet gear carrier 198 and surround and engage the sun gear 194. Each of the planet gears 196 is rotatably supported by the planet gear carrier 198 by means of a mounting pin 200 located within spaced apart aligned mounting apertures provided in the planet gear carrier and locked therein by means of a locking pin 202. A bushing or bearing 204 can be used to rotatably support the planet gear 196 on the mounting pin 200. The inner end of the planet gear carrier 198 is provided with internal splines 206 which receive cooperating external splines formed on the outer end of the spindle member 158 to prevent relative rotation between the spindle 158 and the planet gear carrier 198. A locking pin 208 can be positioned within aligned apertures provided in the locking nut 192 and the inner face of the planet gear carrier 198 to maintain the locking nut 192 in a selected adjusted position.

A ring gear 210 surrounds the planet gear carrier 198 and is provided with internal gear teeth which engage each of the planet gears 196. The ring gear 210, along with a cover plate 212, is secured to the wheel mount 185 by means of a plurality of circumferentially spaced apart bolts 214. A threaded plug 216 is centrally located on the cover plate and can be periodically removed to provide an aperture for introducing a supply of lubricant into the area surrounding the planetary gear assembly 184 and the tapered roller bearings 186 and 188.

It will be appreciated that the planetary gear arrangement shown in the drawings causes the wheel mounting portion 36 to rotate in a direction opposite the rotation of the shaft member 176.

As illustrated in FIG. 3, a pair of conventional brake shoes 218 and 220 are supported relative to the brake mounting plate 160 in a conventional fashion. Anti-rattle brake springs 222 and 224 are shown attached to the brake mounting plate by bolts 226 and 228. A conventional brake drum 230 surrounds the brake shoes 218 and 220 and is secured to the wheel mount 185 by conventional studs 232, which also carry the wheel nuts 234 for use in mounting a wheel (not shown).

Referring now to FIGS. 4 and 5, the details of the spring mounting pad 26 will now be discussed. As shown in FIGS. 4 and 5, the axle tube 22 has a pair of arcuate flange members 240 and 242 welded to the exterior of the tubes at weld locations 244 and 246 respectively. The flange members 240 and 242 include arcuate projections 248 and 250 which cooperate to define an arcuate path over which an upper spring mounting plate 252 can pivot.

The upper spring mounting plate 252 includes an upper plate member 254 which defines an upwardly facing surface 256 for supporting the spring 28, and which is provided with four apertues 258 and at each corner thereof. for receiving the ends of the shackles 30 shown in FIG. 1. Also, the edges of the plate member 254 which are substantially parallel with a longitudinal axis B of the tube 22 are provided with downwardly extending sections or flanges 260 and 262 having arcuate grooves 264 and 266 formed therein in facing relationship to one another. The grooves 264 and 266 are adapted to slidably receive the arcuate projections 248 and 250 of the arcuate flange members 240 and 242 attached to the axle tube 22. Thus, the upper spring mounting plate 252 is supported for pivotal or arcuate movement about a generally horizontal spring axis D which is perpendicular to the axis B of the axle tube 22, but is prevented from pivotal or arcute movement about the axis B. Cutout portions 268 and 270 are formed in the lower surface of the plate member 254 to permit a predetermined range of pivotal movement of the mounting plate 252 relative to the axle tube 22.

Also, it will be appreciated that the spring pad mounting arrangement and/or the planetary gear. reduction assembly can be incorporated in a non-steerable axle assembly.

It will be appreciated that several components of a conventional suspension system have been omitted from the drawings for the purpose of clarity. For example, shock absorbers (not shown) may be incorporated between an unsprung vehicle frame member and a sprung vehicle frame member such as the axle tubes 22 and 22a or the mounting plate 138.

In accordance with the provisions of the patent statutes, the present invention has been described in what is considered to represent its preferred embodiment. However, it should be noted that the invention can be practiced otherwise than as specifically illustrated and described without departing from the scope of the attached claims.

What is claimed is:

1. A steerable driving axle assembly for use with a wheeled vehicle comprising:
   a differential assembly adapted to be attached to a vehicle frame member, said differential assembly having an input shaft adapted to be connected to a source of motive power and having a pair of output shafts;
   a pair of axle drive shafts, each of said axle drive shafts defining a rotating axis and having an inner end coupled to a separate one of said output shafts by a separate universal joint assembly;
   a pair of axle tubes, each of said axle tubes surrounding a separate one of said axle drive shafts and defining a longitudinal axis generally coaxial with said rotating axis of said axle drive shaft;
   means for attaching an inner end of each of said axle tubes to said differential assembly for pivotal movement of said axle tube relative to said differential assembly solely about a generally horizontal axis perpendicular to and intersecting said lognitudinal axis of said axle tube, said attaching means further including means for preventing rotation of said axle tube relative to said differential assembly about said longitudinal axis of said axle tube;
   a pair of wheel assemblies, each of said wheel assemblies including a rotatable wheel member and a mounting portion for rotatably supporting said wheel member;
   each of said axle drive shafts having an outer end coupled to drive a separate one of said wheel members by a separate universal joint assembly;
   each of said axle tubes having an outer end pivotally coupled to said mounting portion of said wheel assembly by a king pin mounting arrangement to enable pivotal movement of said mounting portion relative to said axle tube solely about a king pin axis and to prevent rotation of said mounting portion relative to said axle tube about said longitudinal axis of said axle tube, whereby each of said axle tubes provides a single connecting link between said differential assembly and a respective one of said mounting portions which permits pivotal movement of said mounting portion relative to said differential assembly about said horizontal axis and said king pin axis but prevents rotation of said mounting portion relative to said differential assembly about said longitudinal axis of said axle tube;

steering means coupled to each of said mounting portions of said wheel assemblies for controlling the movement of said wheel assemblies about said king pin axes; and spring means for resiliently supporting each of said axle tubes relative to a vehicle frame member.

2. A steerable driving axle assembly according to claim 1 wherein said spring means includes a pair of leaf spring mounting pads, each of said mounting pads secured to a separate one of said axle tubes and supporting an intermediate portion of a leaf spring having outer ends attached to a vehicle frame member, each of said leaf spring mounting pads including means for permitting arcuate movement of the intermediate portion of said leaf spring relative to said axle tube about a spring axis generally perpendicular to said longitudinal axis of said axle tube, and means for resisting arcuate movement of said intermediate portion of said leaf spring relative to said axle tube about said longitudinal axis of said axle tube.

3. A steerable driving axle assembly according to claim 2 wherein each of said leaf spring mounting pads includes a first member secured to said axis tube and including a first arcuate guide portion defining an arcuate path along which said intermediate portion of said leaf spring can move, and a second member secured to the intermediate portion of said leaf spring and including a second arcuate guide portion which cooperates with said first arcuate guide portion to permit arcuate movement of the intermediate portion of said leaf spring relative to said axle tube about said spring axis and along said arcute path, said first and second guide portions further cooperating to resist arcuate movement of the intermediate portion of said leaf spring relative to said axle tube about said longitudinal axis of said axle tube.

4. A steerable driving axle assembly according to claim 3 wherein said first guide portion includes a pair of spaced apart arcuate flanges respectively secured to oppposite sides of said axle tube and said second member includes a generally horizontal plate secured to the intermediate portion of said leaf spring, said second member further including a pair of spaced apart, downwardly extending sections secured to said plate and having arcuate grooves formed therein in facing relationsip to one another, each of said grooves slidably receiving a separate one of said arcuate flanges.

5. A steerable driving axle assembly according to claim 1 wherein each of said wheel assemblies includes gear reduction means for reducing the rotational speed of said wheel member relative to said axle drive shaft.

6. A steerable driving axle assembly according to claim 5 wherein said gear reduction means includes a planetary gear assembly having a sun gear connected to the outer end of said axle drive shaft, said planetary gear assembly including a ring gear secured to said wheel member and a planet gear carrier interposed between said ring gear and said sun gear and secured to said mounting portion of said wheel assembly.

7. A steerable driving axle assembly according to claim 2 wherein said spring axis intersects said longitudinal axis of said axle tube.

8. An apparatus for attaching a leaf spring to an axle tube of a vehicle comprising:

a spring mounting pad adapted to be secured to the axle tube and adapted to support an intermediate portion of the leaf spring having outer ends attached to a vehicle frame member;

said spring mounting pad including means for permitting arcuate movement of the intermediate portion of the leaf spring relative to the axle tube about a spring axis generally perpendicular to a longitudinal axis of the axle tube; and said leaf spring mounting pad including means for resisting arcuate movement of the intermediate portion of the leaf spring relative to the axle tube about the longitudinal axis of the axle tube.

9. An apparatus according to claim 8 wherein said leaf spring mounting pad includes a first member adapted to be secured to the axle tube and including a first arcuate guide portion defining an arcuate path along which the leaf spring can move, and a second member adapted to be secured to the intermediate portion of the leaf spring and including a second arcuate guide portion which cooperates with said first arcuate guide portion to permit arcuate movement of the intermediate portion of the leaf spring relative to the axle tube about said spring axis and along said arcuate path, said first and second guide portions further cooperating to resist arcuate movement of the intermediate portion of the leaf spring relative to the axle tube about the longitudinal axis of the axle tube.

10. An apparatus according to claim 9 wherein said first guide portion includes a pair of spaced apart arcuate flanges respectively secured to opposite sides of the axle tube and said second member includes a generally horizontal plate secured to the intermediate portion of the leaf spring, said second member further including a pair of spaced apart, downwardly extending sections secured to said plate and having arcuate grooves formed therein in facing relationship to one another, each of said grooves slidably receiving a separate one of said arcuate flanges.

11. An apparatus according to claim 8 wherein said spring axis intersects the longitudinal axis of the axle tube.

12. A driving axle assembly for use with a wheeled vehicle comprising:

a differential assembly adapted to be attached to a vehicle frame member, said differential assembly having an input shaft adapted to be connected to a source of motive power and having a pair of output shafts;

a pair of axle drive shafts, each of said drive shafts defining a rotating axis and having an inner end coupled to a separate one of said output shafts;

a pair of axle tubes, each of said axle tubes surrounding a separate one of said axle drive shafts and defining a longitudinal axis generally coaxial with said rotating axis of said axle drive shaft, each of said axle tubes having an inner end coupled to said differential assembly;

spring means for resiliently supporting each of said axle tubes relative to a vehicle frame member, said spring means including a pair of leaf spring mounting pads, each of said mounting pads being secured to a separate one of said axle tubes and supporting an intermediate portion of a leaf spring having outer ends attached to a vehicle frame member, each set of said leaf spring mounting pads including means for permitting arcute movement of said intermediate portion of said leaf spring relative to said axle tube about of said leaf spring relative to said axle tube about a spirng axis generally perpendicular to said longitudinal axis of said axle tube while resisting arcuate movement of said intermediate portion of said leaf spring relative to said axle tube about said longitudinal axis of said axle tube; and a pair of wheel assemblies, each of said wheel assemblies including a rotatable wheel member and a moutning portion for rotatably supporting said wheel member;

each of said axle drive shafts having an outer end coupled to drive a separate one of said wheel members;

each of said axle tubes having an outer end coupled to said mounting portion of a respective one of said wheel assemblies.

13. A driving axle assembly according to claim 12 wherein each set of said leaf spring mounting pads includes a first member secured to said axle tube and including a first arcuate guide portion defining an arcuate path along which said intermediate portion of said leaf spring can move, and a second member secured to the intermediate portion of said leaf spring and including a second arcuate guide portion which cooperates with said first arcuate guide portion to permit arcuate movement of the intermediate portion of said leaf spring relative to said axle tube about said first spring axis and along said arcute path, said first and second guide portions further cooperating to resist arcuate movement of said intermediate portion of said leaf spring relative to said axle tube about said longitudinal axis of said axle tube.

14. A driving axle assembly according to claim 13 wherein said first guide portion includes a pair of spaced apart arcuate flanges respectively secured to opposite sides of said axle tube and said second member includes a generally horizontal plate secured to the intermediate portion of said leaf spring, said second member further including a pair of spaced apart, downwardly extending sections secured to said plate and having arcuate grooves formed therein in facing relationship to one another, each of said grooves slidably receiving a separate one of said arcuate flanges.

15. A driving axle assembly according to claim 12 wherein said spring axis intersects a said longitudinal axis of said axle tube.

16. A driving axle assembly according to claim 12 wherein each of said wheel assemblies includes gear reduction means for reducing the rotational speed of said wheel member relative to said axle drive shaft, said gear reduction means including a planetary gear assembly having a sun gear coupled to the outer end of said axle drive shaft, a ring gear secured to said wheel member, and a planet gear carrier interposed between said ring gear and said sun gear and secured to said mounting portion of said wheel assembly.

17. A driving axle assembly according to claim 12 wherein each of said wheel assemblies includes a king pin mounting arrangement connected between said axle tube and said wheel mounting portion to enable pivotal movement of said wheel assembly about a king pin axis, and steering means coupled to each of said mounting portions of said wheel assemblies for controlling the movement of said wheel assemblies about said king pin axes.

* * * * *